United States Patent [19]

Hirao et al.

[11] 4,297,609
[45] Oct. 27, 1981

[54] HIGH-VOLTAGE GENERATING DEVICE

[75] Inventors: Tsuneo Hirao; Masao Onishi, both of Neyagawa, Japan

[73] Assignee: Matsushita Electric Industrial Co., Ltd., Osaka, Japan

[21] Appl. No.: 137,007

[22] Filed: Apr. 3, 1980

[30] Foreign Application Priority Data

Apr. 6, 1979 [JP] Japan .............................. 54-46078[U]

[51] Int. Cl.³ .......................................... H01L 41/08
[52] U.S. Cl. .................................................. 310/339
[58] Field of Search ....................... 310/339; 361/260; 431/255

[56] References Cited

U.S. PATENT DOCUMENTS 3,826,952  7/1974  Iwasaki et al. .................. 310/339 X
4,139,792  2/1979  Kondo ................................ 310/339

FOREIGN PATENT DOCUMENTS 2270526 12/1975 France .................................. 310/339

*Primary Examiner*—Mark O. Budd
*Attorney, Agent, or Firm*—Spencer & Kaye

[57] ABSTRACT

A high-voltage generating device generating a high-voltage in response to impartation of an impact to a piezo-electric element, in which an inner casing accommodating therein a hammer for imparting the impact to the piezo-electric element and a hammer spring for imparting a drive force to the hammer is telescopically received in an outer casing of an electrical insulator accommodating the piezo-electric element therein, and a return spring is disposed within the outer casing for normally biasing the inner casing in a return direction in which the inner casing protrudes from the outer casing. In the device, a conductive strip is pressed at one end thereof against the conductive driven member by the return spring and is exposed at the other end thereof to the exterior of the outer casing. The high-voltage generating device can be very easily assembled and can operate with improved characteristics including a stabilized output voltage characteristic, because of the fact that the piezo-electric element is pre-stressed by the return spring. In addition, a grounding connection can be very easily provided.

4 Claims, 4 Drawing Figures

HIGH-VOLTAGE GENERATING DEVICE

BACKGROUND OF THE INVENTION

This invention relates to a high-voltage generating device generating a high voltage in response to impartation of an impact to a piezo-electric element.

SUMMARY OF THE INVENTION

It is a primary object of the present invention to provide a high-voltage generating device of the kind above described which can be easily assembled, which can operate with improved characteristics including a stabilized output voltage characteristic because of the fact that the piezo-electric element is suitably pre-stressed, in which a grounding connection can be very easily provided, and which is therefore advantageous over prior art ones from the viewpoints of cost and operation performance.

In accordance with the present invention, there is provided a high-voltage generating device comprising a piezo-electric element, a driven member of an electrical conductor disposed on one side of the piezo-electric element, an abutment member of an electrical conductor disposed on the other side of the piezo-electric element, an outer casing of an electrical insulator accommodating the piezo-electric element therein in such a relation that the conductive abutment member is partly exposed to the exterior of the outer casing, an inner casing telescopically received in the outer casing, the inner casing accommodating therein a hammer for imparting an impact to the conductive driven member and a hammer spring for imparting a drive force to the hammer, a return spring for normally biasing the inner casing in a return direction in which the inner casing protrudes partly from the outer casing, and a strip of an electrical conductor pressed at one end thereof against the conductive driven member by the return spring and exposed at the other end thereof to the exterior of the outer casing.

DESCRIPTION OF THE PREFERRED EMBODIMENT

Figure 1A:
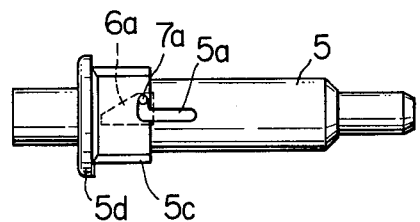
FIGS. 1a and 1b are a front elevational view and a side elevational view respectively showing the external appearance of a preferred embodiment of the high-voltage generating device according to the present invention.
Figure 1B:
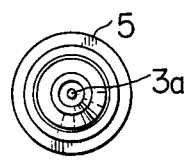

A preferred embodiment of the high-voltage generating device according to the present invention will now be described with reference to FIGS. 1a to 3. Referring to the drawings, the illustrated embodiment comprises a solid cylindrical piezo-electric element 1 molded from a piezo-electric material. An abutment member 3 of an electrical conductor having a discharge terminal 3a is disposed to engage with one or outer end of the piezo-electric element 1 through a spacer 2 interposed therebetween, and a driven member 4 of an electrical conductor having a generally T-like cross section is disposed to engage with the other or inner end of the piezo-electric element 1 through another spacer 2' interposed therebetween. A generally hollow cylindrical outer casing 5 is molded from an electrical insulating resin, and the piezo-electric element 1 is firmly accommodated in the hollow bottom portion of the outer casing 5 in such a relation that the discharge terminal 3a of the conductive abutment member 3 disposed on one side of the piezo-electric element 1 is exposed to the exterior of the outer casing 5.

Figure 2:
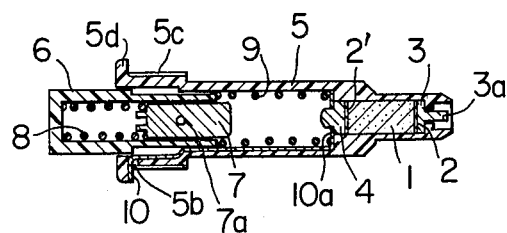
FIG. 2 is a longitudinal sectional view showing the internal structure of the device according to the present invention.
Figure 3:
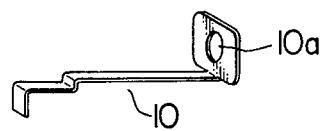
FIG. 3 is a perspective view of the conductive strip forming an essential part of the device according to the present invention.

A generally hollow cylindrical inner casing 6 having a closed outer end is generally molded from an electrical insulating resin and is telescopically received at the other end portion thereof in the outer casing 5. This inner casing 6 accommodates therein a hammer 7 for imparting an impact to the piezo-electric element 1 by impinging against the conductive driven member 4 disposed on the other or inner side of the piezo-electric element 1, and a hammer spring 8 for imparting a drive force to the hammer 7. As shown in FIG. 2, the outer casing 5 is formed with an L-shaped cam slot 5a, and the inner casing 6 is formed with a generally triangular cam slot 6a having an oblique side for cooperation with the cam slot 5a. A locking pin 7a extends laterally from the hammer 7 to engage with these cam slots 5a and 6a. A return spring 9 acts to normally bias the inner casing 6 in a direction in which the closed outer end portion of the inner casing 6 protrudes from the outer casing 6. By the action of this return spring 9, the inner casing 6 forced into the outer casing 5 is urged in the return direction toward its original position shown in FIG. 2.

A generally L-shaped strip 10 of an electrical conductor is electrically connected to the conductive driven member 4 disposed on the inner side of the piezo-electric element 1. This conductive strip 10 is formed at one end thereof with a hole 10a adapted to receive therein the inwardly projecting end portion of the conductive driven member 4, and that end of the conductive strip 10 is pressed against the conductive driven member 4 by the force of the return spring 9. The intermediate portion of the conductive strip 10 is interposed between the return spring 9 and the inner face of the outer casing 5, and the other end of the conductive strip 10 is exposed to the exterior through a hole 5b bored at the corresponding position of the end portion of the outer casing 5 telescopically receiving the inner casing 6 therein. The outer peripheral area of this end portion of the outer casing 5 is threaded as indicated at 5c so that the high-voltage generating device can be mounted on a panel (not shown) of, for example, a gas range or a gas water heater. A flange 5d is formed at that end of the outer casing 5 in contiguous relation with the externally threaded portion 5c. A nut (not shown) makes screw threaded engagement with this externally threaded portion 5c of the outer casing 5 to hold the panel between it and the flange 5d thereby mounting the high-voltage generating device in position on the panel.

In operation, the inner casing 6 is forced into the outer casing 5 of the high-voltage generating device by the hand of the user. With the movement of the inner casing 6 in that direction, the locking pin 7a of the hammer 7 guided along the oblique side of the triangular cam slot 6a of the inner casing 6 is disengaged from the locking portion of the cam slot 5a of the outer casing 5. Consequently, the hammer 7 is urged by the force of the compressed hammer spring 8 to impinge against the conductive driven member 4 disposed on the inner side of the piezo-electric element 1, and a high-voltage is generated from the piezo-electric element 1. This high voltage appears across the discharge terminal 3a of the conductive abutment member 3 and the conductive strip 10 to be utilized for burning gas.

The high-voltage generating device of the present invention having the aforementioned structure can be very simply assembled compared with a prior art one which requires a lead wire for electrical connection to the conductive driven member 4, because it is merely necessary to fit one end of the conductive strip 10 on the inwardly projecting portion of the conductive driven member 4 and dispose the return spring 9 which presses that end of the conductive strip 10 against the conductive driven member 4. Further, a grounding connection can be very simply provided due to the fact that the conductive strip 10 pressed at one end thereof against the conductive driven member 4 by the return spring 9 is exposed at the other end thereof to the exterior of the outer casing 5. This arrangement, therefore, facilitates mounting of the high-voltage generating device on a gas range, a gas water heater or the like. Further, when compared with a prior art high-voltage generating device of this kind in which a casing molded from an electrical insulating resin for accommodating a piezo-electric element therein is generally combined with a casing made of a metal, the high-voltage generating device according to the present invention is constructed so that the outer casing 5 of the electrical insulator can singly accommodate all of the necessary elements including the piezo-electric element 1. Therefore, the high-voltage generating device according to the present invention is quite neat in its external appearance and shape and can thus be manufactured at a very low cost. Further, the high-voltage generating apparatus according to the present invention can operate with improved operation performance due to the fact that the end of the conductive strip 10 receiving the projecting portion of the conductive driven member 4 therein is pressed against the driven member 4 by the return spring 9 to maintain the piezo-electric element 1 in a pre-stressed condition.

The high-voltage generating device of the present invention having the aforementioned structure provides the following meritorious effects or advantages among others:

(1) The device can be very simply assembled due to the fact that the return spring is utilized as a means for pressing one end of the conductive strip, which replaces the prior art lead wire, against the conductive driven member.

(2) The other end of the conductive strip is exposed to the exterior of the outer casing so that the grounding connection can be very simply provided. This facilitates mounting of the device on a gas range, a gas water heater or the like.

(3) The outer casing made of the electrical insulator can singly accommodate all of the necessary elements including the piezo-electric element, and the device is therefore quite neat in its external appearance and shape. This arrangement provides such an advantage that the device can be manufactured at a very low cost.

(4) The device can operate with improved operation performance as a high-voltage generator due to the fact that the piezo-electric element can be pre-stressed by the return spring pressing one end of the conductive strip against the conductive driven member.

We claim:

1. A high-voltage generating device comprising a piezo-electric element, a driven member of an electrical conductor disposed on one side of said piezo-electric element, an abutment member of an electrical conductor disposed on the other side of said piezo-electric element, an outer casing of an electrical insulator accommodating said piezo-electric element therein in such a relation that said conductive abutment member is partly exposed to the exterior of said outer casing, an inner casing telescopically received in said outer casing, said inner casing accommodating therein a hammer for imparting an impact to said conductive driven member and a hammer spring for imparting a drive force to said hammer, a return spring for normally biasing said inner casing in a return direction in which said inner casing protrudes partly from said outer casing, and a strip of an electrical conductor pressed at one end thereof against said conductive driven member by said return spring and exposed at the other end thereof to the exterior of said outer casing.

2. A high-voltage generating device as claimed in claim 1, wherein said conductive strip has a generally L-like shape and is formed at one end thereof with a hole adapted to receive a portion of said conductive driven member therein, the intermediate portion of said conductive strip being interposed between the inner face of said outer casing and said return spring, and the other end of said conductive strip is exposed to the exterior of said outer casing through a hole bored at the corresponding position of the end portion of said outer casing telescopically receiving said inner casing therein.

3. A high-voltage generating device as claimed in claim 1, wherein the outer peripheral area of the end portion of said outer casing telescopically receiving said inner casing therein is threaded for the purpose of mounting said device on a panel, and a flange is formed at that end of said outer casing in contiguous relation with said externally threaded portion.

4. A high-voltage generating device as claimed in claim 1, wherein said inner casing is molded from an electrical insulating resin.

* * * * *